(12) United States Patent
Matsumura et al.

(10) Patent No.: US 6,364,917 B1
(45) Date of Patent: Apr. 2, 2002

(54) METHOD AND EQUIPMENT OF REFINING PLANT OIL AND WASTE VEGETABLE OIL INTO DIESEL ENGINE FUEL

(76) Inventors: Masatoshi Matsumura, 1250-2 Koya, Tsukuba City, Ibaraki (JP), 300-2642; Seishiro Murakami, 1899 Takagi, Mifune-machi Kamimashiki-gun, Kumamoto-ken (JP)

( * ) Notice: Subject to any disclaimer, the term of this patent is extended or adjusted under 35 U.S.C. 154(b) by 0 days.

(21) Appl. No.: 09/496,097

(22) Filed: Feb. 1, 2000

(30) Foreign Application Priority Data

Feb. 1, 1999 (JP) .......................................... 11-024464

(51) Int. Cl.$^7$ ................................................. C10L 1/02
(52) U.S. Cl. ............................ 44/301; 44/308; 554/133
(58) Field of Search ........................... 44/639, 308, 436, 44/301; 554/133

(56) References Cited

U.S. PATENT DOCUMENTS

| | | | |
|---|---|---|---|
| 2,083,572 A | * 6/1937 | McKee ........................ 549/431 |
| 3,504,038 A | 3/1970 | Beal et al. |
| 4,407,747 A | 10/1983 | Lippe et al. |
| 4,451,267 A | 5/1984 | Schwab et al. |
| 4,591,602 A | * 5/1986 | De Villez .................... 514/463 |
| 4,696,638 A | 9/1987 | DenHerder |
| 4,929,252 A | 5/1990 | Brillhart |

FOREIGN PATENT DOCUMENTS

| | | | |
|---|---|---|---|
| DE | 27 13 863 A1 | 10/1978 | ............ C07C/75/00 |
| DE | 32 44 007 A1 | 6/1983 | ............ C11B/3/00 |
| EP | 0 029 472 | 6/1981 | ............ C10G/27/00 |
| EP | 0 249 463 | 12/1987 | ............ C10L/1/02 |
| FR | 606079 | 6/1926 | |
| FR | 2 647 461 | 11/1990 | ............ C09C/3/04 |
| GB | 1066457 | 4/1967 | |
| GB | 1 540 142 | 2/1979 | ............ C12B/1/12 |

OTHER PUBLICATIONS

Dietsche et al; Mix or Match: Choose the Best Mixers Everytime: Chemical Engineering: NY Aug. 1998.*
Patent Abstracts of Japan, vol. 010, No. 103 (C–340) Apr. 18, 1986 (Makoto Ogose).
Patent Abstracts of Japan, vol. 1997, No. 09; Sep. 1997 (Murakami Seishiro).

* cited by examiner

Primary Examiner—Margaret Medley
Assistant Examiner—Cephia D. Toomer
(74) Attorney, Agent, or Firm—Pendorf & Cutliff

(57) ABSTRACT

A method for refining virgin plant oil and/or waste vegetable oil into fuel, preferably diesel engine fuel, wherein said method comprises the steps of
  heating the oil
  supplying water and/or ozone
  mixing the oil with water and/or ozone and
  agitating the mixture of oil and water and/or dissipating the ozone.

24 Claims, 21 Drawing Sheets

NOVEL OZONATION PROCESS OF WASTE COOKING OIL

Removal rate of impurities based on ozone concentration

Methyl ester diesel oil

METHOD AND EQUIPMENT OF REFINING PLANT OIL AND WASTE VEGETABLE OIL INTO DIESEL ENGINE FUEL

BACKGROUND OF THE INVENTION

1. Field of the Invention

The present invention is related to a method for refining virgin plant oil and/or waste vegetable oil into fuel, an oil obtainable by said method and an apparatus for refining virgin plant oil and/or waste vegetable oil into fuel.

2. Description of the Related Art

In Japan, environmental pollution due to waste vegetable oil such as oil used in cooking tempura has been a problem of society for years now. Disposal of waste vegetable oil from restaurants and from the general household involves processing that most consumers regard burdensome.

In an official announcement, waste vegetable oil discarded by the restaurants and food manufacturing industries amounts to approximately 200,000 tons, while another 200,000 tons come from the general household totalling 400,000 tons a year. However, comparing this to the 1.2–1.4 million tons of vegetable oil produced by manufacturers every year, the amount of waste vegetable oil is actually very large.

In the last two to three years, the recycling of waste vegetable oil into diesel engine fuel has been the focus of attention of research and development. Foremost of this is the "methylesteric fuel production method". FIG. 11 shows the general principle of this method. According to this method, waste vegetable oil is mixed with methanol or ethanol and a catalyst (sodium hydroxide), heated, and agitated. As shown in the figure, an esteric exchange reaction occurs, separating into methylester and glycerin.

Further elaborating this, FIG. 10 shows the processes in the methylesteric fuel production. For the waste vegetable oil (101) in the pre-treatment process (112), its impurities (admixtures, moisture, free fatty acids) are removed (102, 103, 104) through a distiller ensuring a good fuel yield. Upon completing the pre-treatment process, the waste vegetable oil is transferred (105) to the esteric exchange reaction equipment, mixed with methanol or ethanol at 30k by volume (to be expressed in "%" from hereon) and sodium hydroxide as catalyst at 0.10–0.15% of methanol volume, and agitated. Through the eterification process (113) including the process (107) involving water and kaolin, the raw material is finally separated into the fuel (108) and glycerin waste (109). The glycerin waste is further neutralized and decomposed (110), and handed over to the industrial waste processors.

However, this methylesterification technology has the following problems:

(1) Since the process requires mixing the waste vegetable oil with 30–50% methanol or ethanol, the cost of raw material increases.

(2) The cost of constructing the processing plant is made more expensive by the high combustibility of methanol or ethanol.

(3) There are problems in the safety of the operation.

(4) Fuel yield upon refining is low at 70% or less.

(5) Diesel oil produced from this method emits more formaldehyde, acrolein, benzene and the like when used as fuel due to the addition of methanol or ethanol. These emissions are even more than commercially-available diesel oil from petroleum. It would be, thus, difficult, to consider it a "clean" fuel.

SUMMARY OF THE INVENTION

This invention aims to provide a method and equipment for refining and recycling virgin plant oil and/or waste vegetable oils which can be used as diesel engine fuel, which allow to overcome the problems of the methylesterification technology. More particularly, a method was to be provided which allowed for the production of fuel from virgin plant oil and/or waste vegetable oil not making use of esterification.

According to the invention, the problem is solved by a method for refining virgin plant oil and/or waste vegetable oil into fuel, preferably diesel engine fuel, whereby said method comprises the steps of heating the oil supplying water and/or ozone mixing the oil with water and/or ozone and agitating the mixture of oil and water and/or dissipating the ozone.

In an embodiment of the inventive method, said method is characterized in that said steps form a pre-treatment step.

In a further embodiment, the pre-treatment step further comprises a step of separating the oil from the water.

In another embodiment, the oil is heated to a temperature of about 40° C. to about 80° C.

According to the invention, the water which is preferably ozonated, is supplied in an amount of about 3 to about 8% by volume of the oil, preferably about 5% by volume of the volume of the oil in the inventive method.

In a preferred embodiment, the ozone is supplied from the bottom of a vessel containing at least the oil and the water, preferably with a concentration of about 4,000 to about 30,000 ppm, most preferably about 7,000 ppm.

In another preferred embodiment, the mixing and/or agitating and/or dissipating is done by a screw-type propeller with sawtooth-edged blades, preferably rotating at about 300 rpm.

According to the invention, the pre-treatment takes about 20 to about 30 minutes.

In another embodiment of the inventive method, said method comprises a further step of supplying ozone to the oil.

In a more preferred embodiment, the oil is heated to a temperature of about 40° C. to about 80°C.

In another embodiment of the inventive method, the ozone is supplied with about 4,000 to about 30,000 ppm, preferably from the bottom of a vessel which contains the oil.

According to the invention, the ozone is supplied to the oil for about 50 to about 90 minutes.

Also according to the invention, the method may comprise a further step of adding activated kaolin to the oil received from the pre-treatment.

In a more preferred embodiment, the amount of activated kaolin added is about 5% by volume to about 8% by volume.

In an even more preferred embodiment, the kaolin is removed from the oil before further supplying ozone to the oil obtained from the pre-treatment.

The problem underlying the present invention is also solved by an oil obtainable by practicing the inventive method.

Furthermore, the problem is solved by an apparatus for refining virgin plant oil and/or vegetable oil into fuel, whereby the fuel is preferably diesel engine fuel, and the apparatus is preferably intended for use in the inventive method whereby said apparatus comprises at least a first processing tank which is an agitation tank which comprises a propeller-like agitator which has sawtooth-edged blades.

In a preferred embodiment of the inventive apparatus the propeller-like agitator is attached to an agitation shaft below a conventional impeller.

In a further preferred embodiment of the inventive apparatus said apparatus comprises a second processing tank, wherein said tank comprises at least one of the means selected from the group comprising an agitation propeller, an ozone gas spin distributor device, an activated charcoal tube, a heater and an intake valve.

The inventors have surprisingly found that the disadvantages of the conventional methylesterification technology as stated above can be overcome by the inventive method and by the inventive apparatus. Particularly, said inventive method produces "clean" exhaust gas and has a low plant construction cost and refining production cost. Besides these technical advantages, economical advantages may arise which render the method and apparatus according to the invention market-competitive.

Furthermore, the new kind of oil which can be produced according to the inventive method may be used as fuel, particularly as diesel engine fuel, and this new fuel exhibits a better quality then gasoline.

Briefly, and for purpose of illustration only and not for limitation the invention's process is characterized by heating the virgin plant oil and/or waste vegetable oil to 40–80° C. and agitating it by mixing it with ozone-filled water heated to 40–80° C. while supplying ozone gas from the lower part of the tank. This agitation process separates and removes, along with the water, impurities contained in the waste vegetable oil such as glycerin and animal fatty acids.

Furthermore, inside the agitation tank, a propeller-like agitator which has sawtooth-edged blades is attached to the end of its rotational shaft. With this structure, ozone gas emitted upwards is adsorbed and decomposed by activated charcoal.

Moreover, with the aforementioned as an initial treatment, the processed oil (with its impurities separated and removed) is reheated to 40–80° C. and refined by agitating it with fine ozone gas bubbles supplied from the lower part of the tank. This comprises the secondary treatment. Similarly, ozone gas emitted upwards in this process is adsorbed and decomposed by activated charcoal.

In summary, virgin plant oil and waste vegetable oil heated to 40–80° C. are mixed with water, the volume of which is 3–8% by the volume of the oil and heated to 40–80° C., and agitated by supplying ozone gas with a concentration of 4,000–30,000 ppm from the lower part of the tank. This pre-treatment process separates and removes, along with the water, impurities contained in the waste vegetable oil such as glycerin and animal fatty acids. Upon completion of the pre-treatment process, the processed oil is mixed with 5–8% activated kaolin and agitated. This primary treatment filters impurities by adsorbing them to the activated kaolin. Upon completion of the primary treatment, the processed oil is reheated to 40–80° C. in the processing tank while being supplied from the lower part of the tank with fine ozone gas bubbles with a concentration of 4,000–30,000 ppm, and then agitated. This secondary treatment refines the processed oil.

The main difference between diesel engine fuel refined from vegetable oil and gasoline refined from petroleum is, first, the former does not contain sulfur. Due to recent environmental concerns, there has been a clamor to reduce the sulfur content of gasoline by half, and this poses a major problem for the industry. However, fuel refined from vegetable oil basically does not have this problem.

Secondly, oil used in cooking tempura and the like clogs pipes when drained down the sink, and this can prove to be a burdensome waste. The invention aims to hit two birds with one stone by effectively utilizing natural resources while solving the waste and environmental problems.

Third is the cost of production. There have been a lot of instances wherein, due to high cost, even if the process contributes to the recycle of natural resources, production is not viable. In this invention, almost no raw material is basically required aside from ozone (i.e. electrical power), activated charcoal, and activated kaolin, thus making cheap diesel engine fuel from waste vegetable oil possible.

Fourth is the quality of the diesel engine fuel. As stated below, a major part of the fuel produced through this invention has a lower molecular weight than gasoline and has a better combustibility. Moreover, its $NO_x$ emission, which along with $SO_x$ is a problem, is extremely low.

Fifth, unlike petroleum, this invention carries no tax burden and, therefore, has an added value of supplying users with cheap fuel. It is to be noted that this advantage is a more economic one and does not necessarily apply for all countries.

BRIEF DESCRIPTION OF THE DRAWINGS

The invention is further illustrated by the figures and the following example from which further features of the invention as well as advantages may be taken, wherein.

DETAILED DESCRIPTION OF THE INVENTION

Figure 1:
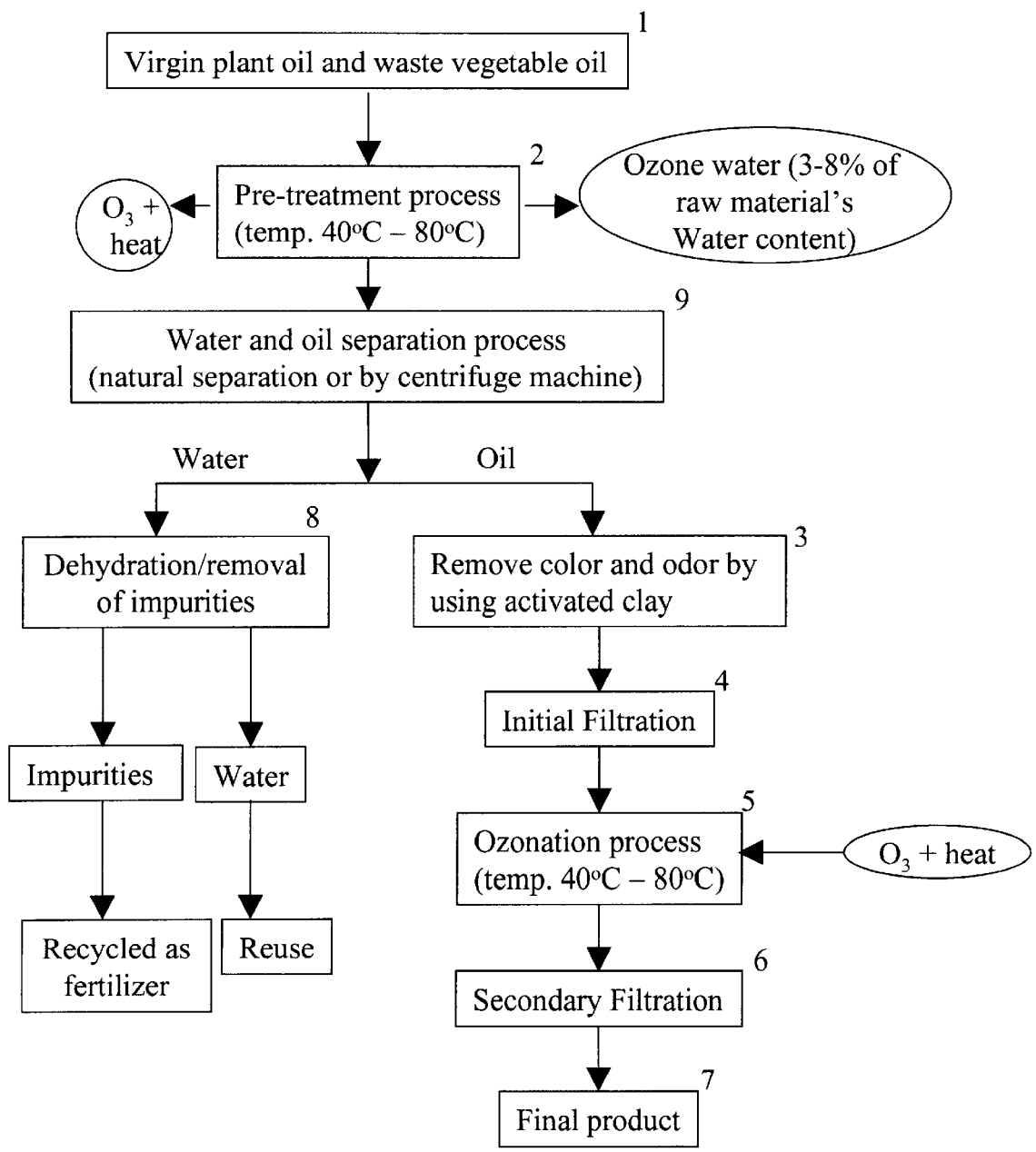
FIG. 1 is a diagram showing the entire process of this invention's procedure for converting and refining virgin plant oil and/or waste vegetable oil into fuel, particularly for use in diesel engines.

This invention, as shown in FIG. 1, consists of the following seven (7) processes:

(1) Pre-treatment
(2) Oil—water separation
(3) Primary treatment
(4) Initial filtration
(5) Secondary treatment
(6) Secondary filtration
(7) Dehydration and removal of impurities The following is a general explanation of this invention as shown in FIG. 1.

In the pre-treatment (1), virgin plant oils and waste vegetable oils (to be referred to as "raw material" from hereon) are first mixed with ozone-filled water then stirred in an agitator; they are filled with ozone gas while being heated. When this pre-treatment (1) is completed, the raw material is transferred to the water-oil separation (9) where only the oil is sent to the primary treatment (3) while water is sent to the water-impurity removal (8). The main objective of the pre-treatment is to remove the impurities from the waste oil. In the primary treatment (3), the raw material is combined with activated kaolin and agitated; in the initial filtration (4), the activated kaolin is removed, and the raw material is sent to the secondary treatment (5). In the secondary treatment (5), the raw material which has completed the initial filtration (4) is mixed with ozone gas while being heated, then stirred in an agitator. This time, the ozone gas has been reduced to fine bubbles. The main objective of the secondary treatment is to refine (i.e. cracking) the oil (i.e. vegetable oil) removed of impurities. This refining process is partly achieved in the pre-treatment process. The raw material which has completed the secondary treatment (5) is filtered through activated charcoal in the secondary filtration (6), and the final product emerges. Meanwhile, water and impurities removed in the water-oil separation (9) are separated from one another in the water-impurity removal (8); the water is recycled into the ozone-filled water required in the pre-treatment, while the impurities are combined with compost and recycled into fertilizer.

Each process is described in detail as follows:
(1) Pre-treatment

Figure 2:
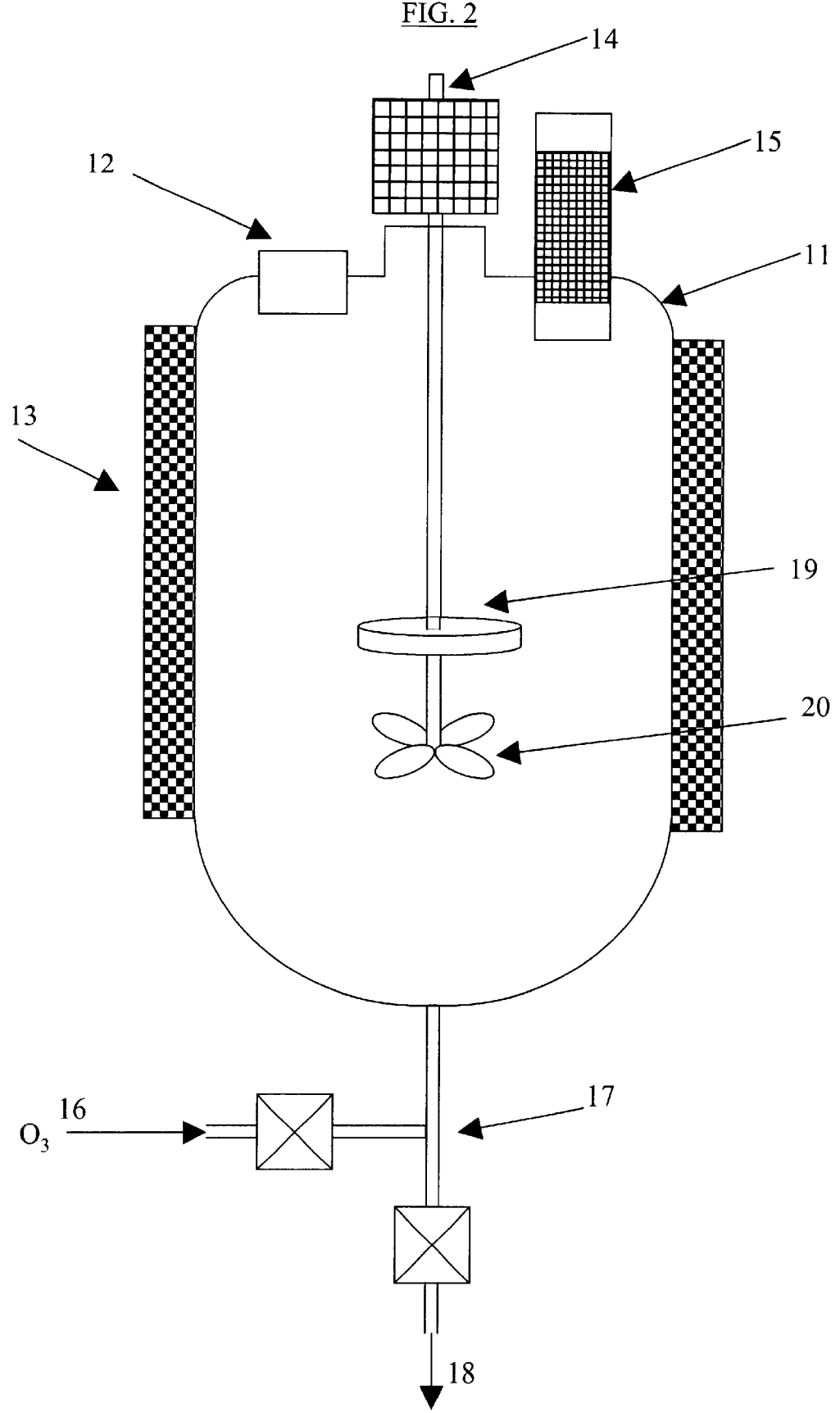
FIG. 2 is a diagram showing the equipment used in the pre-treatment process of this invention.
Figure 12:
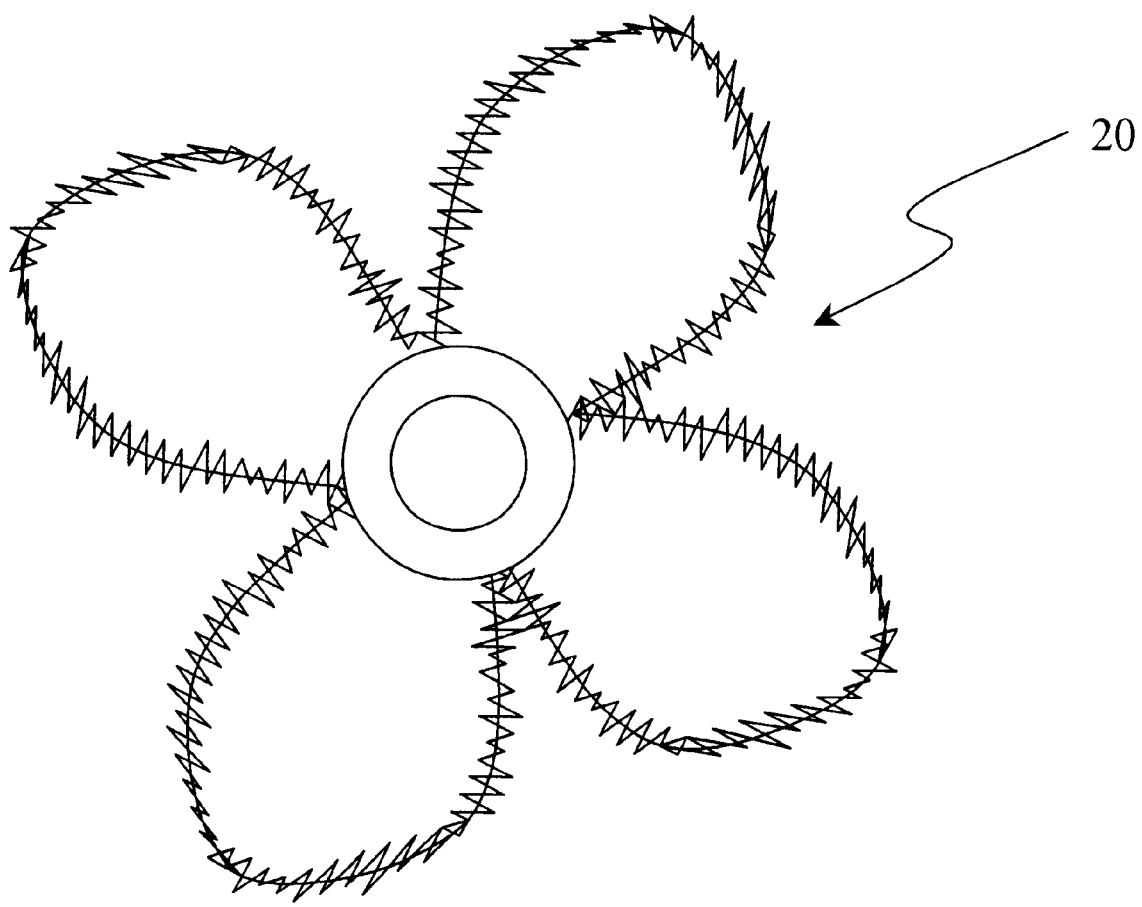
FIG. 12 is a diagram showing the unique agitator blades.

In FIG. 2, the equipment to be used in the pre-treatment (1) is shown. FIG. 2 includes the processing tank (11), intake valve (12), heater (13), agitator (14), activated charcoal tube (15), ozone gas intake valve (16), pipe (17), and exhaust valve (18). The figure likewise includes a conventional agitation impeller (19) and a special screw-type agitation propeller (20) attached to the agitation shaft just below the conventional-type impeller (19). As shown in FIG. 12, this screw-type propeller is equipped with sawtooth-edged blades.

The raw material heated to 40–80° C. is mixed with water heated to 40–80° C. and filled with ozone at 3–8% by volume (to be simply expressed in "%" from hereon), and simultaneously stirred in an agitator equipped with the special four-bladed agitation propeller (20). Ozone gas with a concentration of 4,000–30,000 ppm is supplied from the bottom of the tank; the agitator's speed is approximately 300 rpm. This pre-treatment is to be performed for 20 to 30 minutes. Due to agitation caused by the special propeller, the raw material and ozone gas are reduced to finer bubbles thus increasing contact. When the heater reaches a temperature of 40–80° C., the impurities (glycerin, animal fatty acids) in the raw material are oxidized by the ozone, transformed into hydrophilic matters, and extracted into the water filled with ozone. The ozone gas that has been used pass through the activated charcoal tube (15) where it is absorbed and decomposed, and is therefore rendered harmless.

The "agitation" described above is not aimed at mixing the liquids but rather at breaking down the water into finer droplets (water in oil emulsion). Consequently, if a conventional propeller (19) as shown in FIG. 2 is used, an extremely high speed is required. However, this kind of high-speed rotation is unsafe, and therefore cannot be actualized. In order to achieve the same level of performance as that of a high-speed rotation, this invention makes use of a special screw-type propeller with sawtooth-edged blades. By using this special propeller, the same level of performance as that of a high-speed rotation can be achieved at approximately 300 rpm. In doing so, ozone-filled water and ozone gas are broken down, and these different particles form emulsion; impurities in the waste vegetable oil (glycerin, animal fatty acids) are efficiently oxidized, transformed into hydrophilic matters, and are extracted by the fine water droplets with ozone and separated. The difference between a conventional impeller and the special propeller is as follows:

While the conventional impeller is aimed at mixing liquids or mixing a liquid with other substances, the special propeller effectively integrates and emulsifies them by high shear force. In order to ensure also uniform agitation within the processing tank, a conventional impeller has been attached above the special propeller.

In this process, the ozone enhances to extract the impurities from the raw material (waste vegetable oil), i.e. the impurities from the waste vegetable oil are oxidized, transformed into hydrophilic matters and transferred into water at 23 in FIG. 3 as described below.

Figure 13:
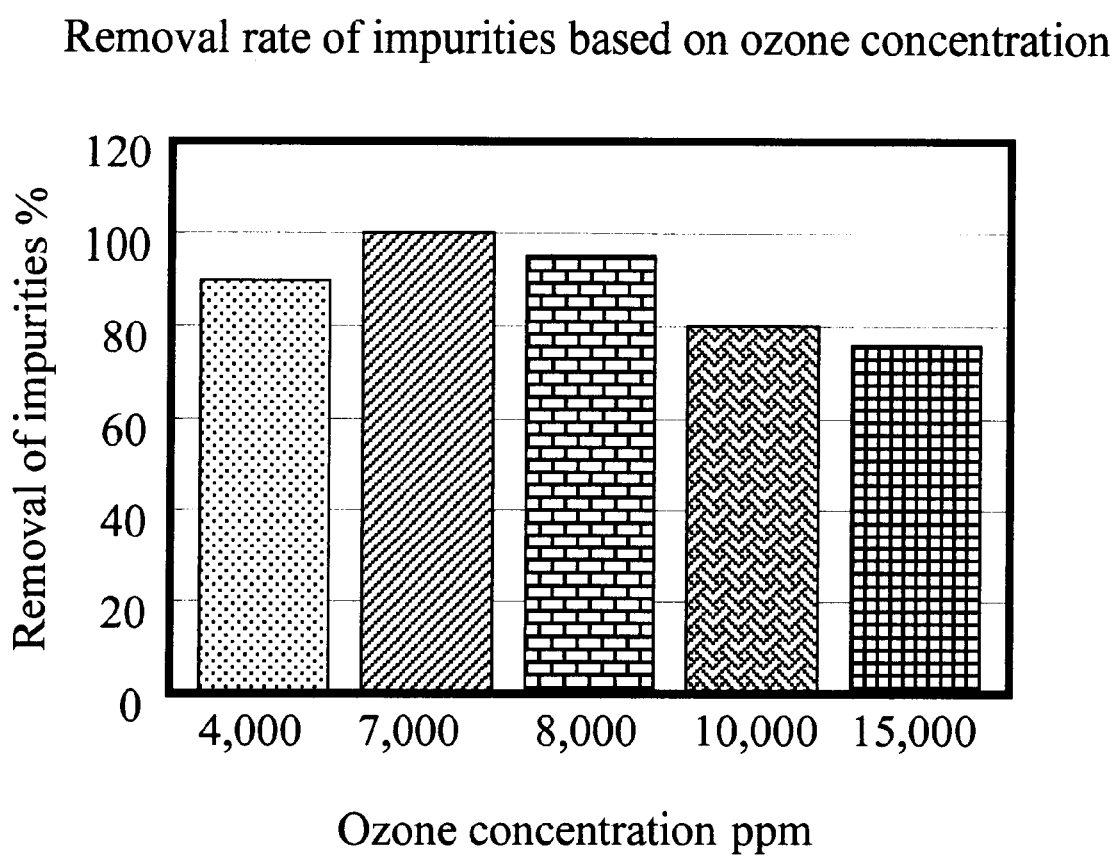
FIG. 13 is a graph showing the effect of ozone concentration on the removal rate of impurities.
Figure 14:
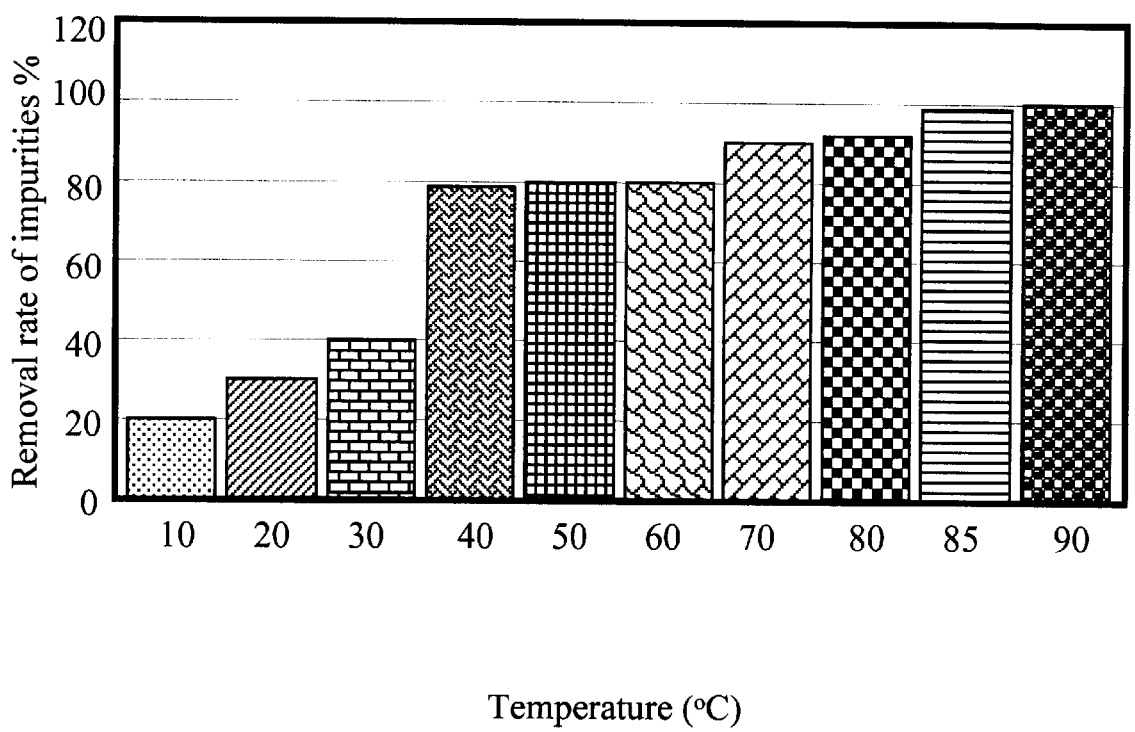
FIG. 14 is a graph showing the effect of temperature on the removal rate of impurities.

The separation rate of the impurities depends on the ozone concentration as shown in FIG. 13. In the figure, an ozone concentration of 4,000–30,000 ppm is desirable. The ozone referred to is the one in the gas phase (1 ppm=2.14 mg ($O_3$)/m$^3$) Particularly, within the vicinity of 7,000 ppm is most suitable. Since, in the processing of waste vegetable oil through this invention, the part of expenses brought about by the generation of ozone is huge, a lower ozone concentration may be employed if production cost is to be put into consideration. Ozone-filled water at 3–8% of the raw material (5% is desirable) is placed in another vessel, heated to 40–80° C., and mixed in. With the effect of high-speed rotation brought about by the agitation using the special propeller and pressurized injection, water is broken down into finer droplets. The temperature of the raw material is set to 40–80° C. The graph of the separation rate of the impurities based on temperature is shown in FIG. 14. Heating has a positive effect on the viscosity of the raw material, thereby increasing the speed at which impurities are transferred into the fine water droplets which in turn improves the rate of separation.

Though the main objective of the pre-treatment is to separate the impurities contained in the waste vegetable oil, not unlike the secondary treatment described below, it likewise facilitates refining (cracking) of the vegetable oil by mixing it with ozone. Consequently, the equipment for this process can also be used on virgin plant oil which contains almost no impurities.

(2) Water-oil Separation

Figure 3:
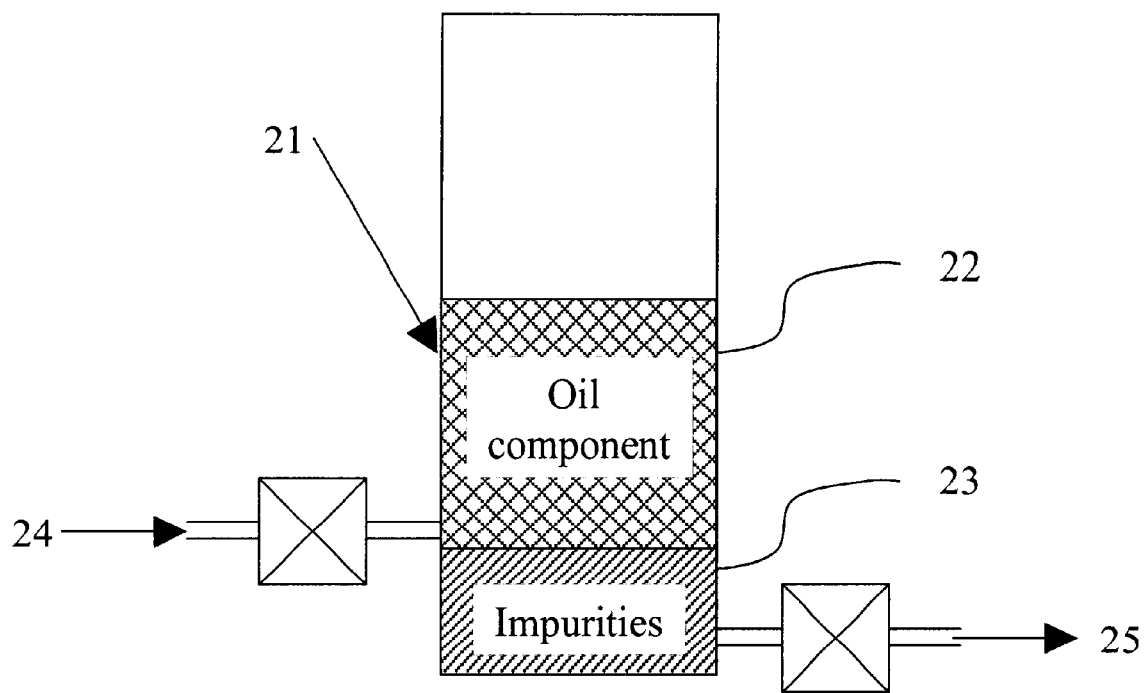
FIG. 3 is a diagram showing the equipment used in the water and oil separation process of this invention.

FIG. 3 shows an overall diagram of the water-oil separation process. Raw material which has undergone pretreatment undergoes water-oil separation here. The method of separation may either be natural separation which makes use of the difference in specific gravities, or with the use of a centrifuge. FIG. 3 is an explanatory diagram of natural separation: oil (22) goes through primary treatment (24), while the impurities (23) which have settled at the bottom goes through dehydration and removal of impurities (25).

Although ozone-filled water (3–8% of raw material) was added at the pre-treatment, its final volume becomes about 30–50% more than the initial volume. This is caused by the extraction of glycerin and animal fatty acids from the raw material.

(3) Primary Treatment

Figure 4:
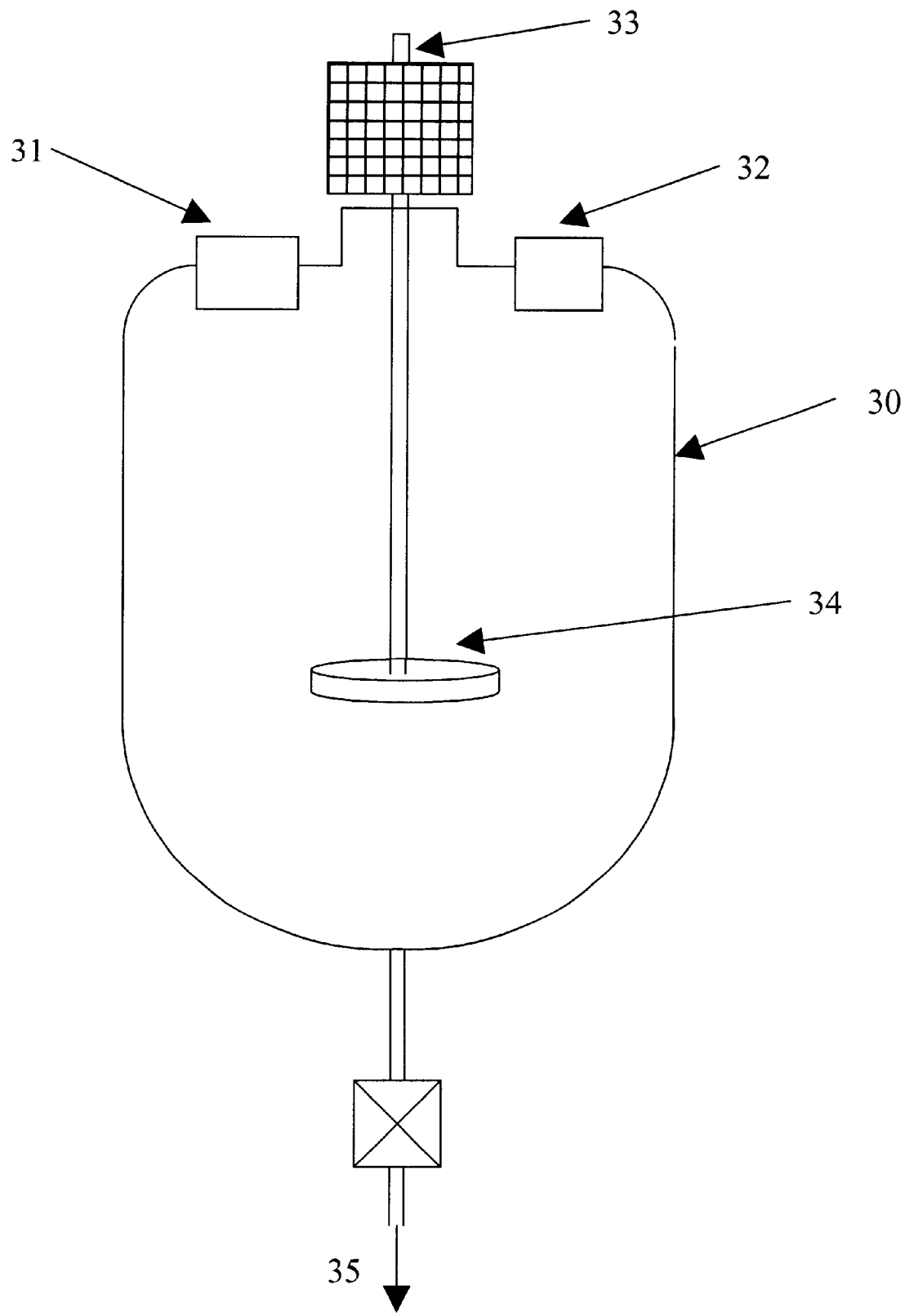
FIG. 4 is a diagram showing the equipment used in the primary treatment process of this invention.

FIG. 4 shows the equipment used in the primary treatment. The figure shows the processing tank (30), raw material intake valve (31), activated kaolin intake valve (32), agitator (33), and agitation propeller (34). Raw material which has undergone water-oil separation is mixed with 5–8% activated kaolin and placed in the agitator for 20–30 minutes. This process decolorizes the raw material.

(4) Initial Filtration

Figure 5:
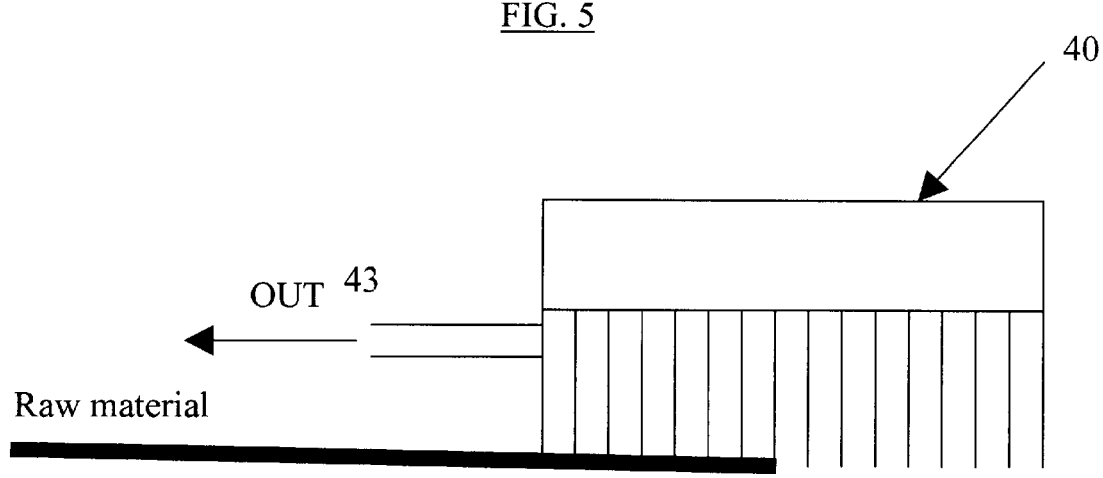
FIG. 5 is a diagram showing the equipment used in the initial filtration process of this invention.

As shown in FIG. 5, activated kaolin which had fully adsorbed impurities and has lost its activity, is removed using a pressurised press machine from the raw material which has undergone primary treatment.

(5) Secondary Treatment

Figure 6:
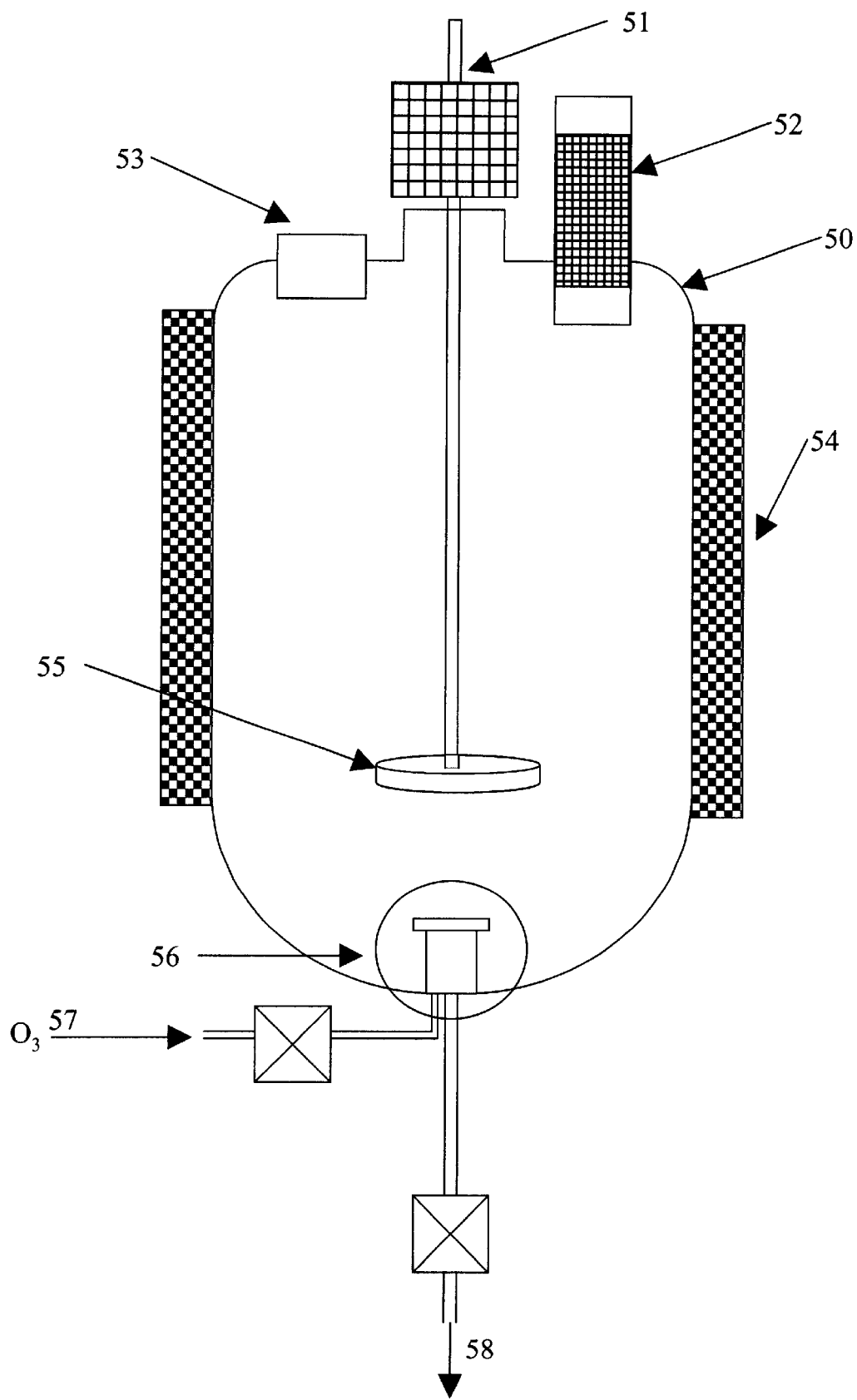
FIG. 6 is a diagram showing the equipment used in the secondary treatment process of this invention.

FIG. 6 shows the equipment used in the secondary treatment. The figure shows the processing tank (50), agitator (51), activated charcoal tube (52), intake valve (53), heater (54), and agitation propeller (55), and ozone gas spin distributor device (56).

Raw material which has undergone initial filtration is heated to 40–80° C. and supplied with 4,000–30,000 ppm of ozone gas from the lower part of the tank. Directly above the ozone gas release valve at the tank's lower part is where the ozone gas spin distributor device (56) is installed. Along with an ordinary agitation propeller (55), the agitator rotates at a speed of 300–350 rpm in order for the fine ozone gas bubbles to evenly integrate with that of the raw material. Processing time takes 50–90 minutes. Ozone gas which has been used passes through the activated charcoal tube (51) where it is adsorbed and rendered harmless.

As stated above, ozone gas which comes in contact with the spinning top is broken down into finer bubbles and is injected into the raw material. Through this ozone gas, refining (cracking) of the raw material is performed, and a product of better quality than that of methyl-esteric reaction is produced.

(6) Secondary Filtration

Figure 7:
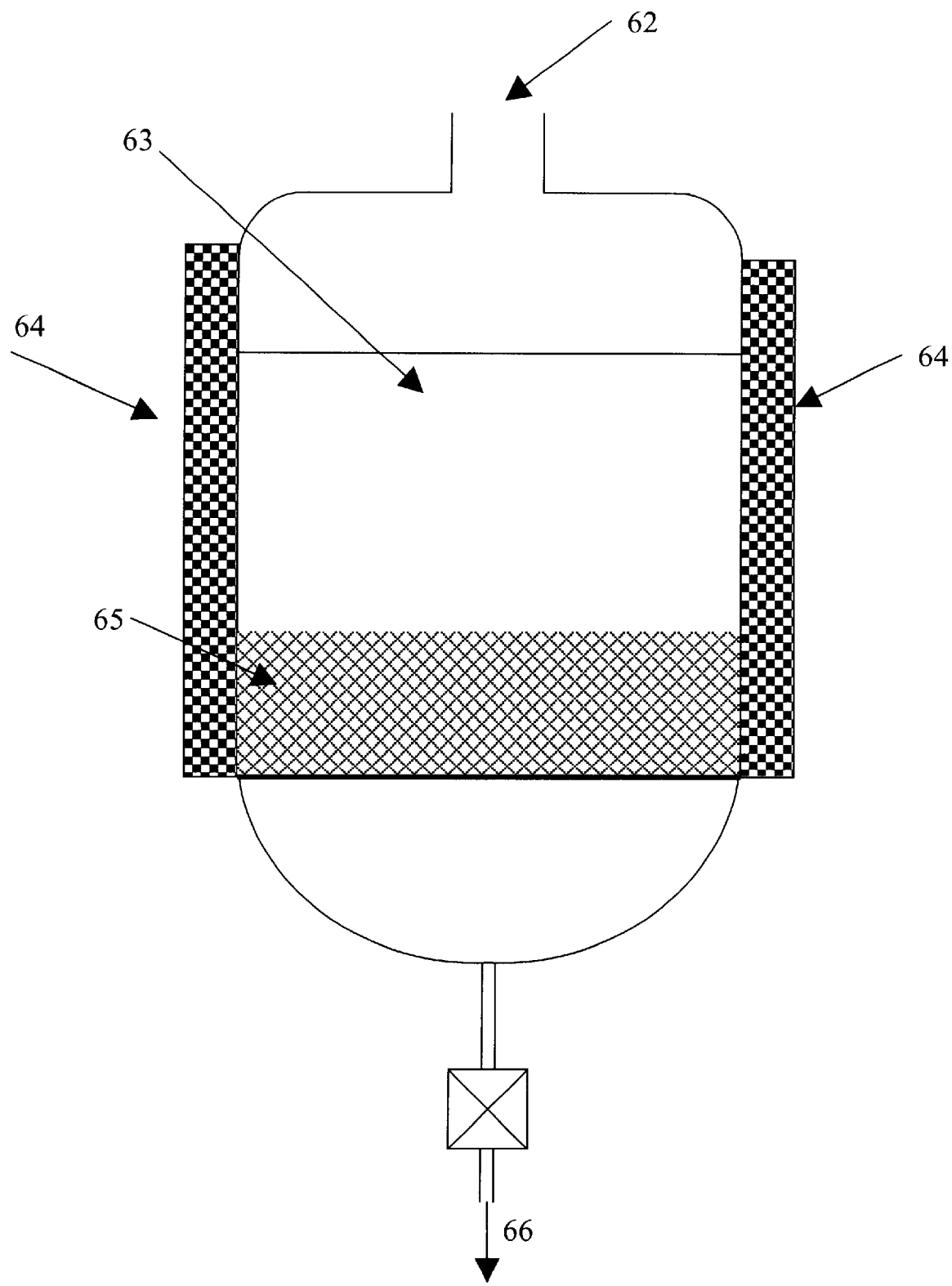
FIG. 7 is a diagram showing the equipment used in the secondary filtration process of this invention.

Raw material which has undergone secondary treatment is made to pass through the filtration equipment shown in FIG. 7. In the filtration tank (61), activated charcoal (filtration material: 65) is installed through which the raw material is made to pass in order to be filtered and produce the final product. As in FIG. 7, a heater may be installed inside the filtration equipment, or the raw material may be heated at the secondary treatment and continuously sent to the filtration stage. However, the temperature of the raw material in the filtration equipment must be at least 65° C. Filtration may be natural or pressure type. In FIG. 7, the natural type of filtration is shown. The filtration material (activated charcoal) is about 5–8% of the raw material.

(7) Dehydration and Removal of Impurities

Figure 8:
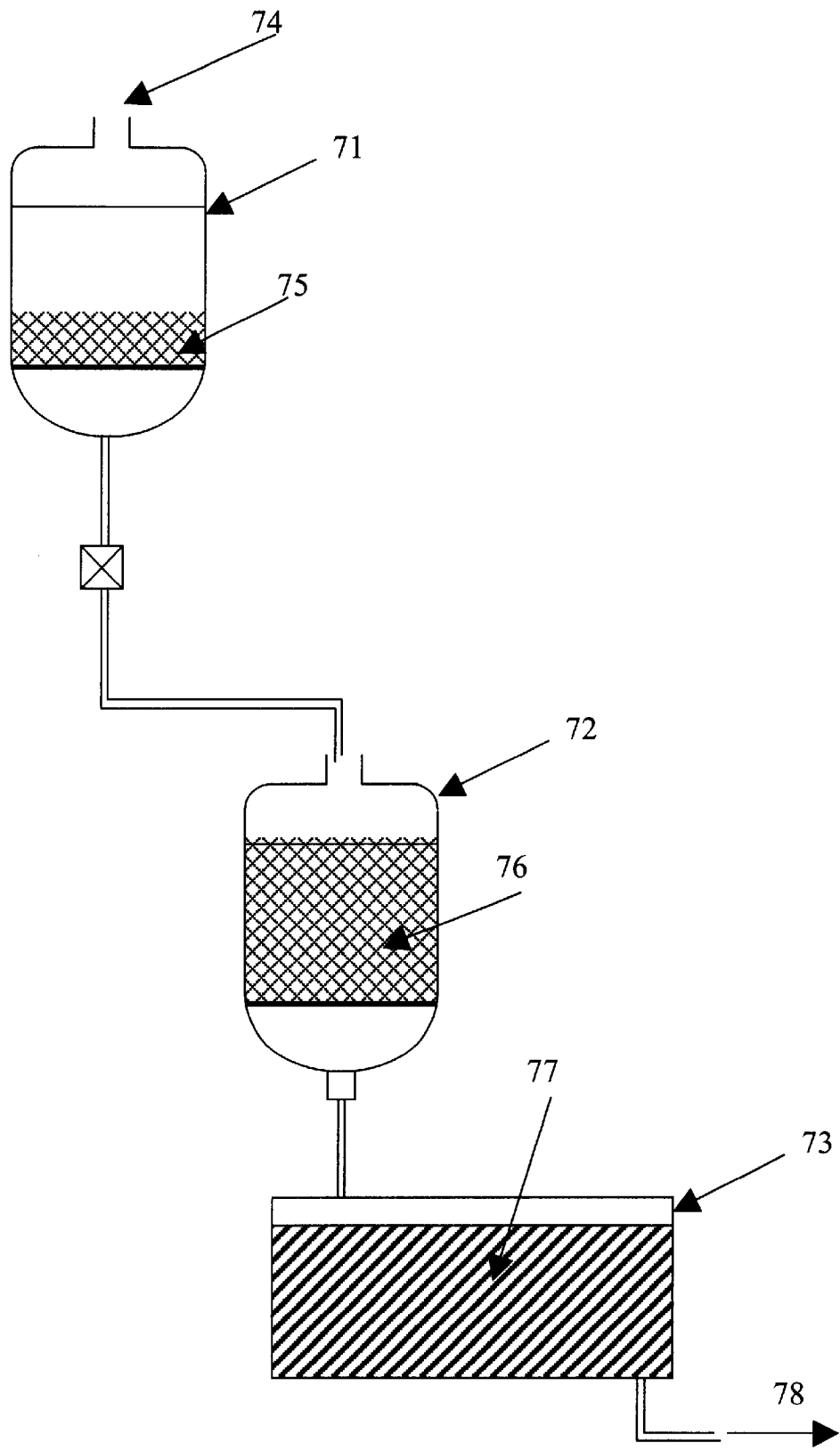
FIG. 8 is a diagram showing the equipment used in the dehydration and removal of impurities in the process of this invention.
Figure 9:
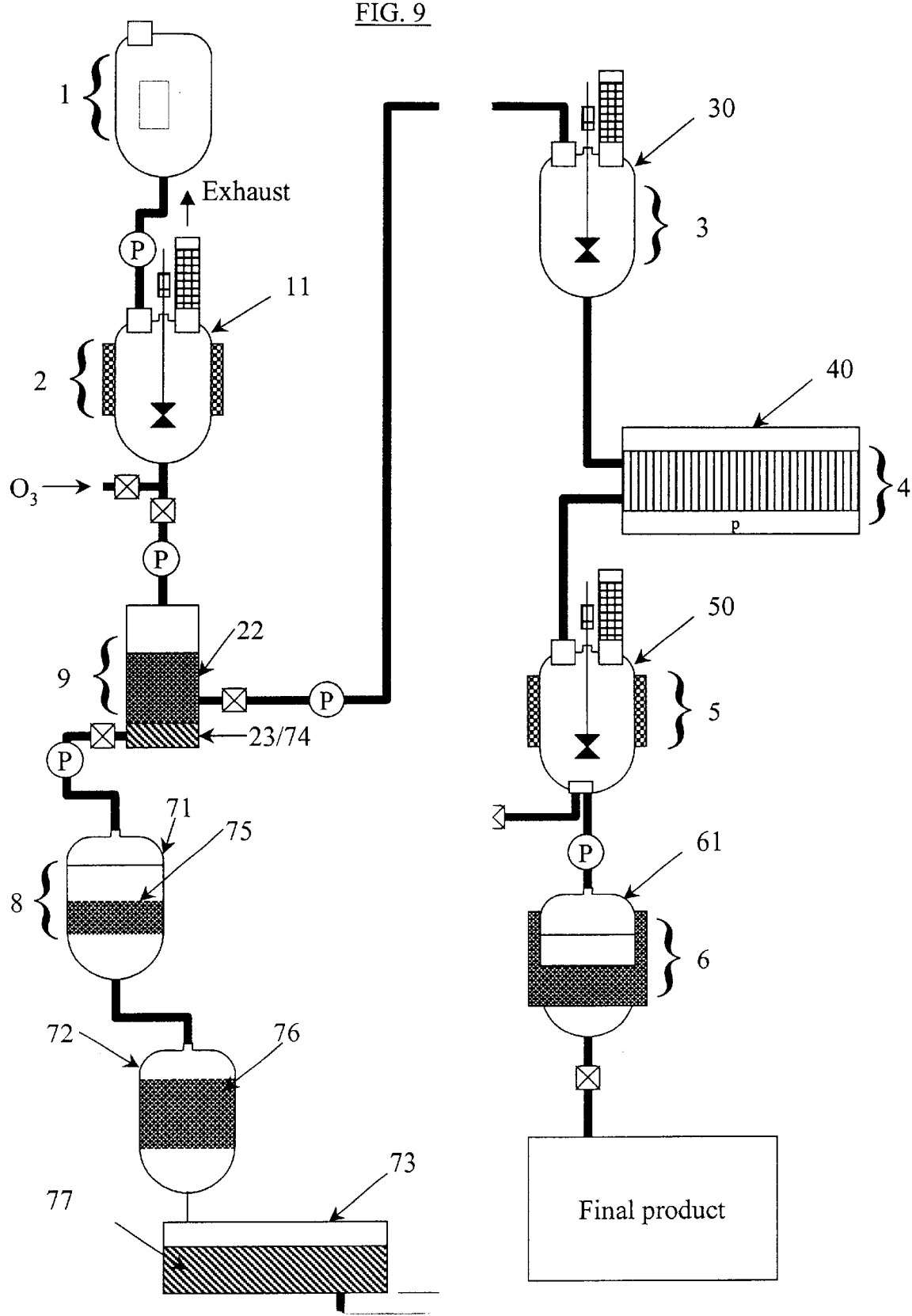
FIG. 9 is a diagram showing the invention's entire process in converting and refining waste vegetable oil for use in diesel engines.
Figure 10:
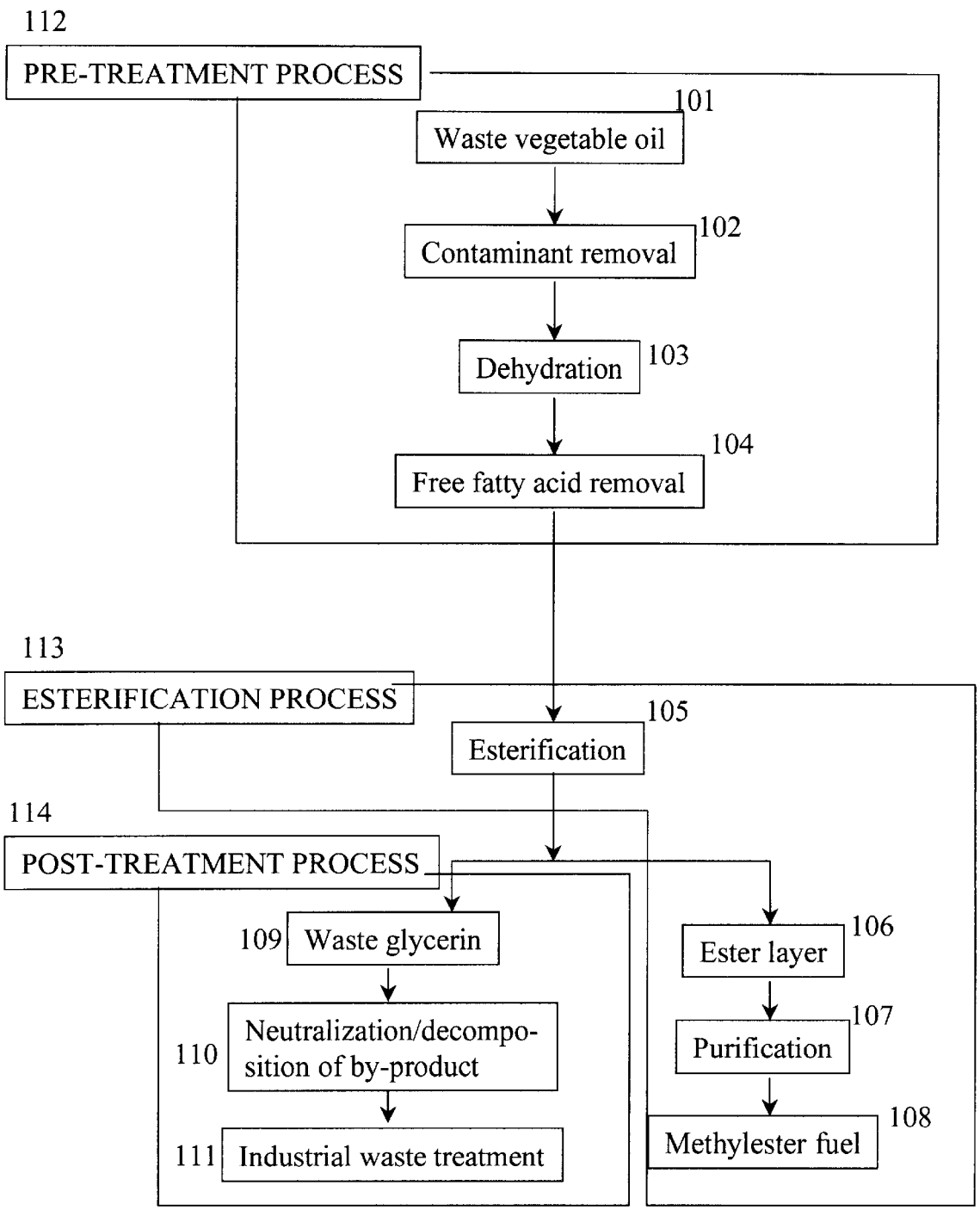
FIG. 10 is a diagram showing the traditional methylesterification process of converting waste vegetable oil into fuel.
Figure 11:
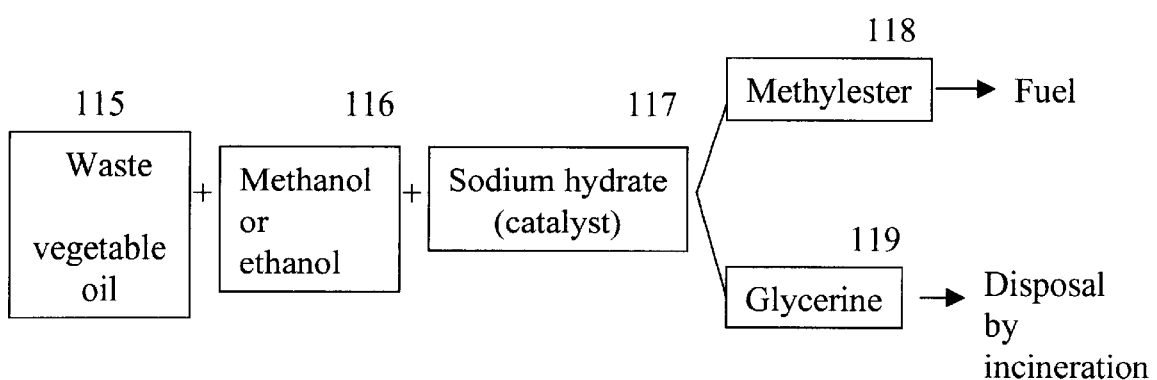
FIG. 11 is a diagram showing the principle of methylesterification.

In the water-oil separation stage, water containing impurities are separated into water and impurities. FIG. 8 shows the equipment used for this. Processing water containing impurities (74) is removed of its impurities using an impurity adsorption material (75). Impurities which have been removed are mixed with compost and are then used as fertilizer for agricultural use. Water cleansed of its impurities is filtered through activated charcoal (76) and is reused in the ozone-filled water used in the preliminary treatment. FIG. 9 shows a summary of the all the stages involved.

In one embodiment of the inventive method, the ozone dosage is 210 [g-03/m3-oil] in the preliminary stage with reaction time from 30 to 60 minutes and 420 [g-03/m3-oil] in the cracking stage with reaction time from 1 hour to 3 hours. Figures higher than these can result in polymerization making the ozone product hard and viscous. The term g-03 is (Q×C×t) with Q as the ozone flow rate in liters/min, C. is the ozone concentration in gas phase (gram/liter) and t is the time in minutes.

The result of the gas chromatography analysis of the product procured from the testing plant of this invention is explained next.

Figure 15:
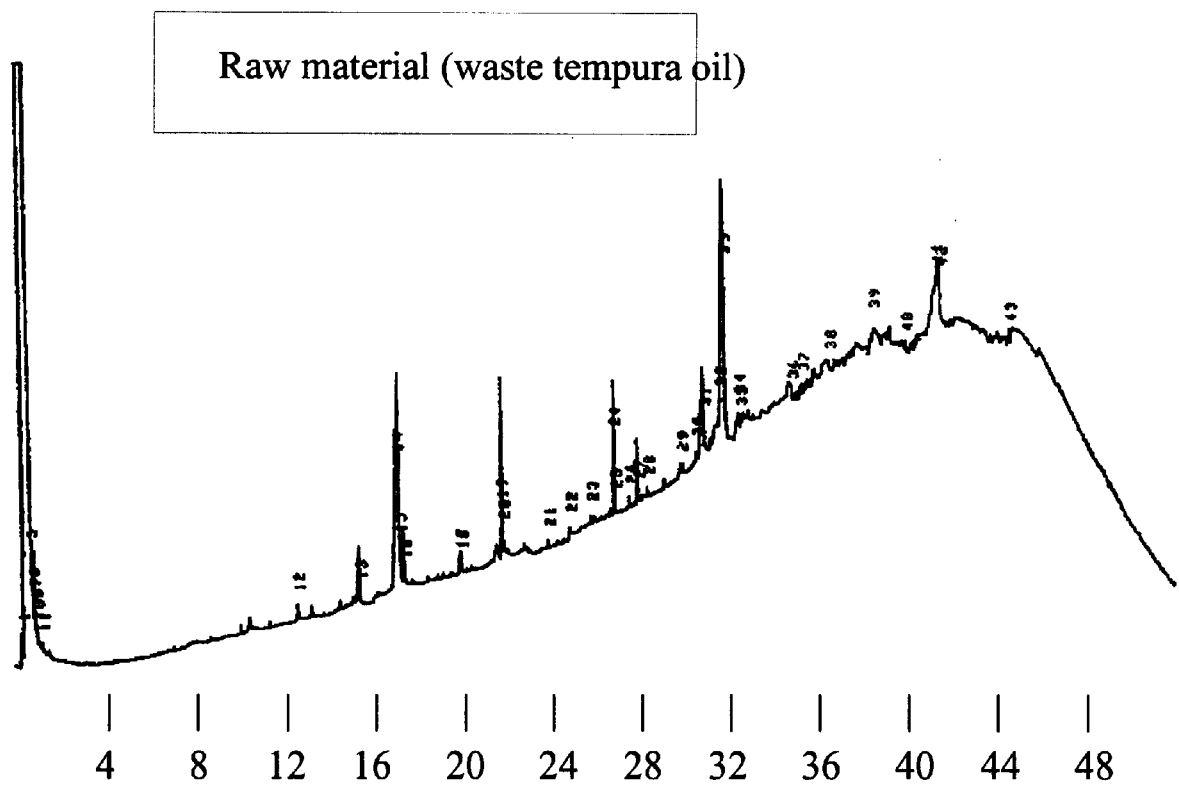
FIG. 15 is a diagram showing the results of the chromatographic analysis of waste vegetable oil.
Figure 16:
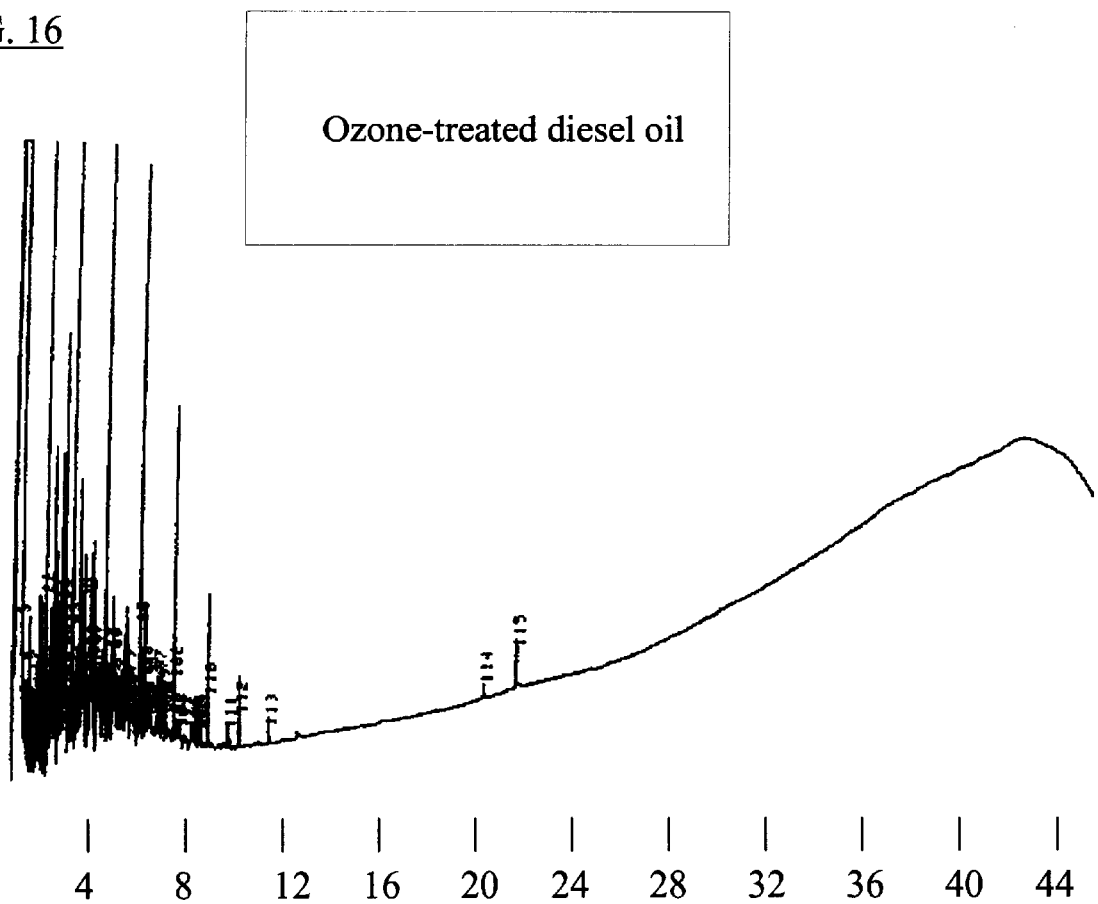
FIG. 16 is a diagram showing the results of chromatographic analysis of fuel refined through this invention.
Figure 17:
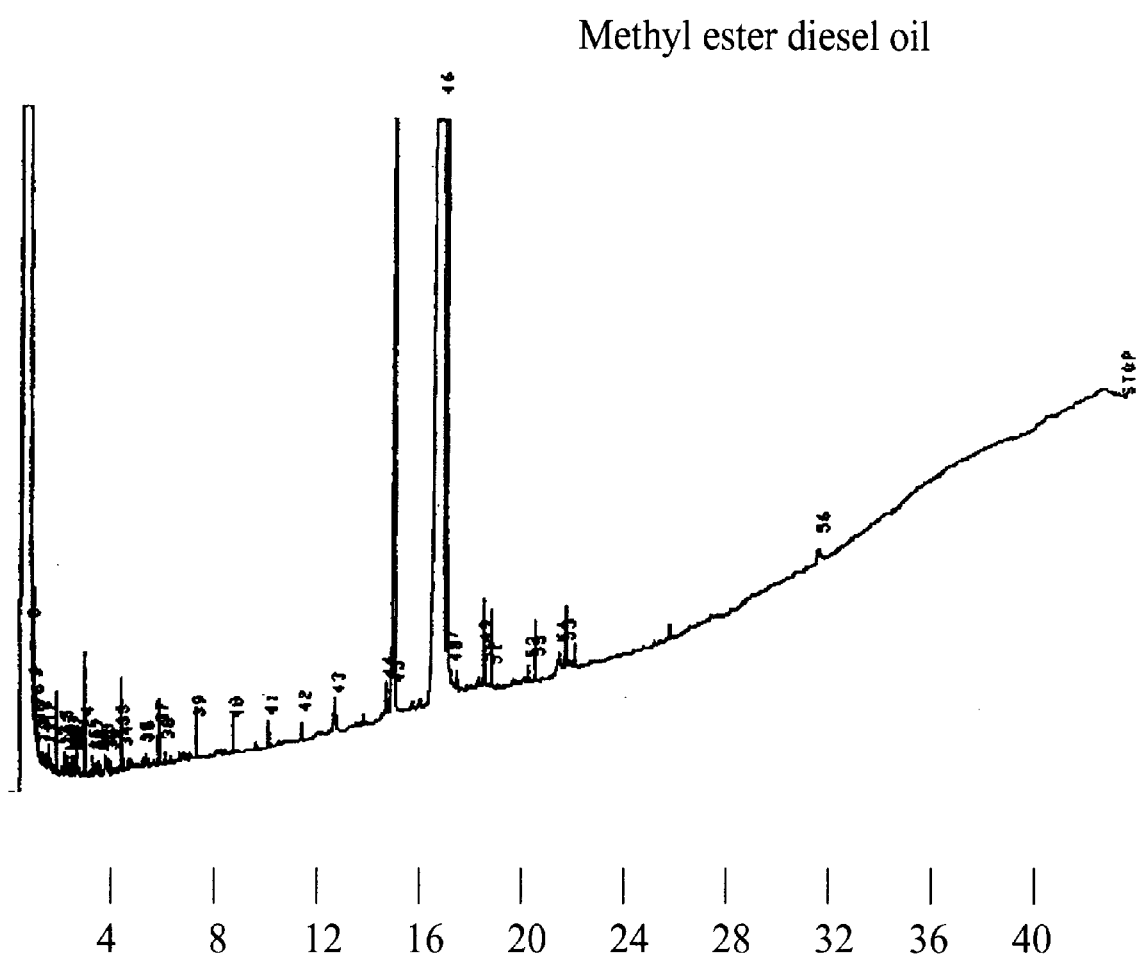
FIG. 17 is a diagram showing the results of chromatographic analysis of fuel refined through the conventional methylesterification technology.
Figure 18:
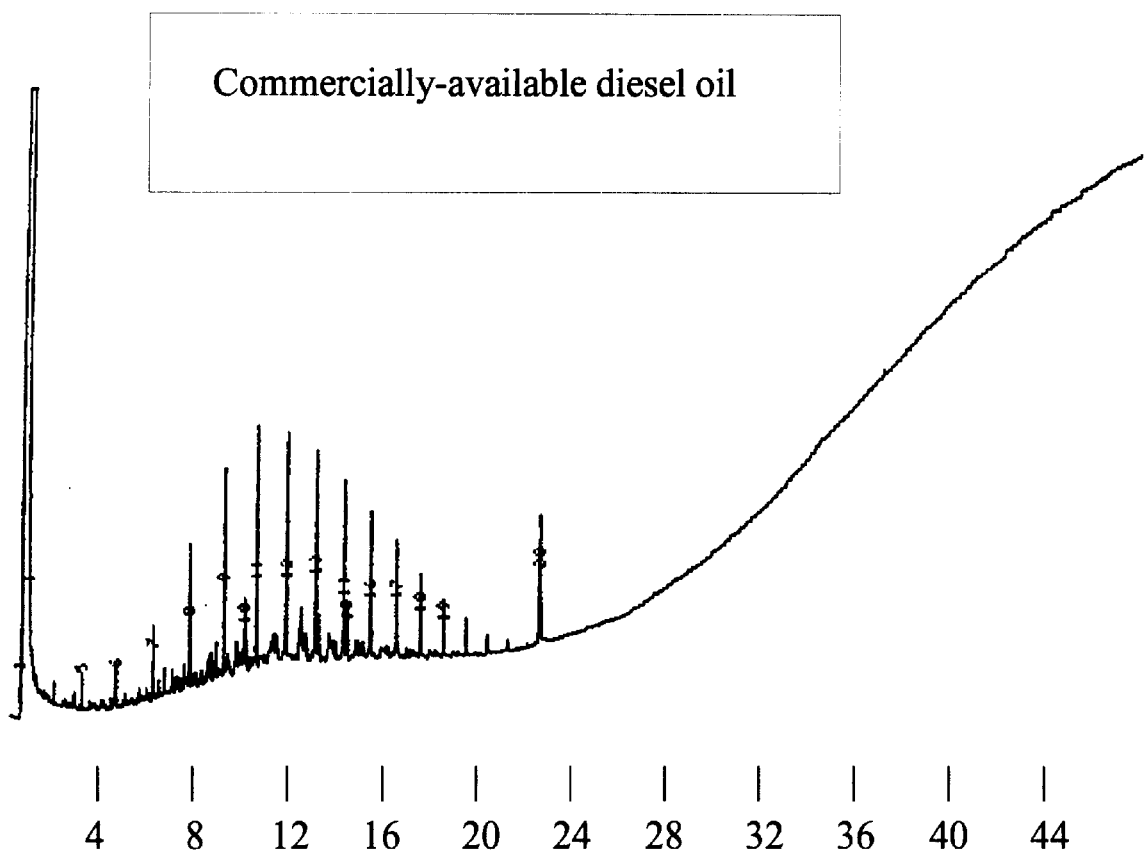
FIG. 18 is a diagram showing the results of chromatographic analysis of diesel fuel in the market.
Figure 19:
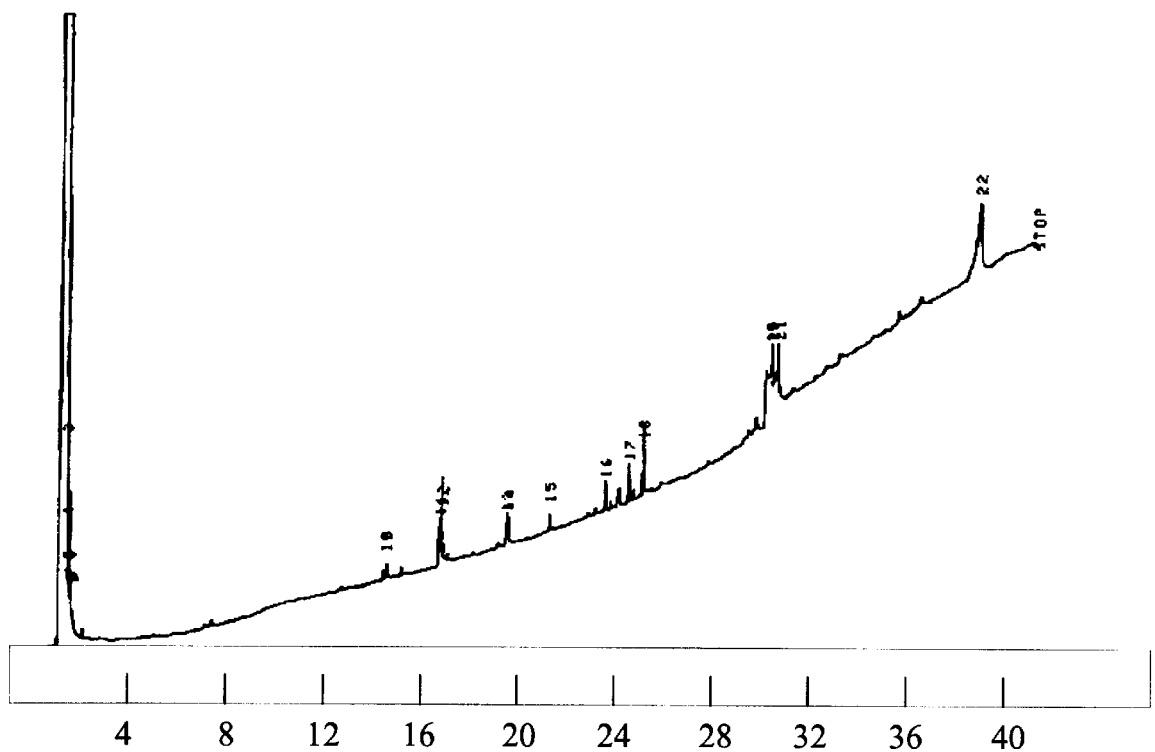
FIG. 19 is a diagram showing the results of chromatographic analysis of pure salad oil.
Figure 20:
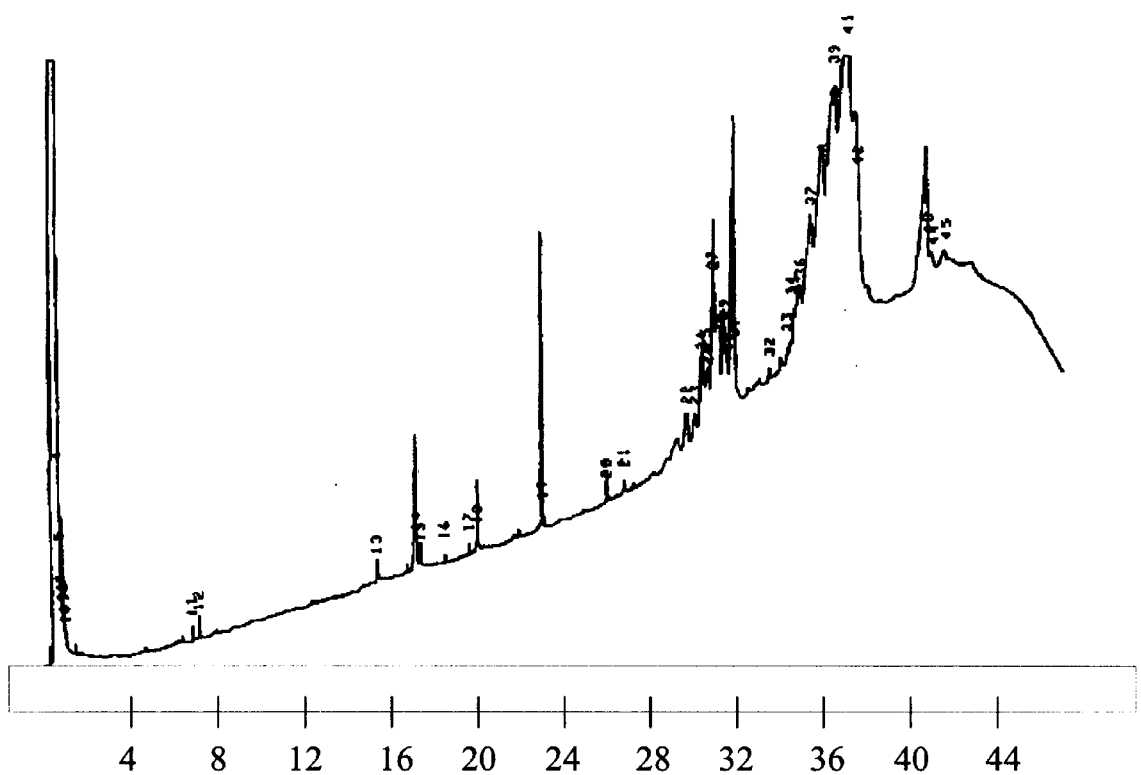
FIG. 20 is a diagram showing the results of the chromatographic analysis of pure olive oil.

FIG. 15 shows the analytical graph of waste cooking (tempura) oil, while FIG. 16 shows the analytical result of the refined product through this invention. By way of reference, FIG. 17 shows the analytical result of waste vegetable oil refined through the methylesterification method, FIG. 18 shows that of commercially available diesel oil from petroleum, FIG. 19 shows that of pure (virgin) salad oil, and FIG. 20 shows that of pure (virgin) olive oil. Shimadzu gas chromatography was used for the analysis. Conditions set for the analysis are as follows:

| | |
|---|---|
| Column | Ultra alloy 1-EX (15 m) |
| Carrier gas | He (2 ml/min) |
| Column temperature | 50° C.–350° C. (rate: 10° C./min) |
| Detector | FID (390° C.) |

Looking at FIG. 16, it is clear that a major portion of the product refined through this invention's method has its molecular weight concentrated over a very low value. This means that, as shown in FIGS. 15, 19, and 20, the double bond of carbon atoms (C═C) found in vegetable oil has been cleanly cut by the oxidation caused by the ozone gas. Surprisingly, comparing to FIG. 18, the product has a lower molecular weight than commercially available diesel oil from petroleum. As given evidence by the combustion test described below, the fuel refined through this invention has extremely good combustibility and has almost no air pollutants. On the other hand, fuel refined through the methylesterification method, as shown in FIG. 17, peaks at a high molecular weight and has a high ignition point, but is not necessarily better than commercially available diesel oil from petroleum. The results of ignition point measurements are shown in Table 1.

TABLE 1

BIODIESEL OIL USING WASTE VEGETABLE OIL

| | UNIT | METHYL ESTER OIL | OZONE TREATED OIL |
|---|---|---|---|
| Calorific potential | kcal/kg | 9490 | 9730 |
| Ash | wt % | less than 0.01 | less than 0.01 |
| Density | 15° Cg/cm$^3$ | 0.8841 | 0.8758 |
| Ignition point | ° C. | 130.1 | 51.3 |
| Sulfur content | wt % | 0.01 | 0.01 |
| Nitrogen content | wt % | less than 0.1 | less than 0.1 |

In Table 1, "upon S Co. refining" is fuel refined through the methylesterification, while "upon MEI refining" is fuel refined though this invention. "Before treatment" refers to vegetable oil before refining. As shown in Table 1, the ignition point of "upon MEI refining" is 51.3° C. and burns extremely well, while that of "upon S Co. refining" is 130.1° C. and burns quite poorly. A clear cause of this is the difference in their molecular weights.

Figure 21:
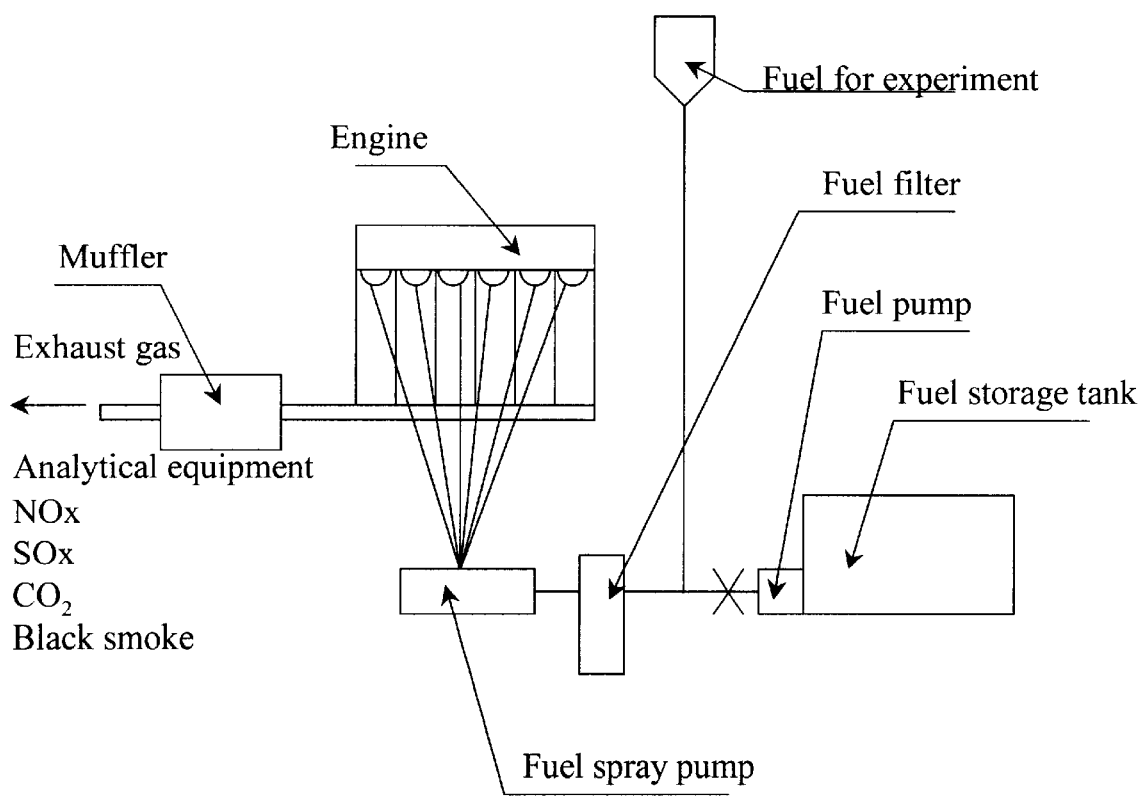
FIG. 21 is a diagram showing the diesel engine used for the actual testing of gas emissions.

The result of the gas emission measurement using the test equipment in FIG. 21 are shown in Table 2.

TABLE 2

COMPOSITION OF EXHAUST GAS FROM DIESEL ENGINE

| Diesel Fuel | Engine operating condition | SOx vol. ppm | NOx vol. ppm | CO$_2$ vol. % | O$_2$ vol. % | Black smoke visual observation |
|---|---|---|---|---|---|---|
| Commercially available diesel oil | idling | less than 10 | 170 | 2.5 | 17.0 | undetectable |
| | 1500 rpm | less than 10 | 110 | 2.6 | 16.9 | undetectable |
| Ozone-treated diesel oil | idling | less than 10 | 72 | 2.9 | 16.2 | undetectable |
| | 1500 rpm | less than 10 | 80 | 2.9 | 17.0 | undetectable |

In Table 2, emissions are compared to that of commercially available diesel oil from petroleum; "revive" refers to the fuel refined through this invention.

In Table 2, it is interesting to note that, aside from the obvious low sulfur oxide emission, the nitrogen oxide emission is much lower than that of commercially available diesel oil from petroleum. Even from the standpoint of gas emission, the fuel refined through this invention is better than commercially available diesel oil from petroleum.

The procedure and equipment of this invention is capable of refining waste vegetable oil, the disposal or incineration of which has been a problem, into fuel for diesel engine use, in a short period of time and at little expense. Utilizing no chemicals, having little equipment risk, and hardly producing any post-refining waste matter, it has, therefore, remarkable efficacy even as a recycling system. Furthermore, in case of utilization as fuel, it has a far better combustibility than fuel refined from the present methylesterification technology. Also, its CO$_2$, NO$_x$ and SO$_x$ volume content in the exhaust gas is 50–30% or even lesser than the gas emitted from the present diesel engine fuel, which makes it a practical clean fuel for the improvement of the atmospheric environmental pollution.

A diesel engine fuel of this good quality can be recycled from waste vegetable oil, recycled simply and inexpensively at close to normal temperature. The procedure of this recycle system of waste vegetable oil is an epoch-making event. In connection with this it is to be noted that this kind of fuel can be manufactured by using ozone only and not be using ersterification.

The features disclosed in the foregoing description, in the claims and/or in the accompanying drawings may, both separately and in any combination thereof, be material for realizing the invention in diverse forms thereof.

Reference Number List

1 Virgin plant oil and waste vegetable oil
2 Pre-treatment process
3 Primary treatment process
4 Initial filtration process
5 Secondary treatment process
6 Secondary filtration process
8 Dehydration and removal of impurities process
9 Water and oil separation process
11 Treatment tank
12 Inlet
13 Heater
14 Agitating machine
15 Charcoal pipe
20 Unique agitating blades
21 Water and oil separating machine
30 Treatment tank
32 Charcoal kaolin inlet
33 Agitating machine
34 Agitating blades
40 Press machine
50 Treatment tank
56 Procedure for breaking down ozone gas into fine bubbles
61 Filtration tank
65 Filtering material
71 Impurities absorbing tank
72 Charcoal filter tank
104 Process for removing extracted fatty acids
105 Ester replacement process

What is claimed is:

1. A method for refining virgin plant oil and/or waste vegetable oil into fuel, comprising the steps of:

a) heating a volume of the oil to a temperature of 40 to 80° C.;

b) introducing at least one of (i) ozone and water, (ii) ozonated water and (iii) water into said oil to produce a product;

c) mixing the product of step (b); and d) agitating the mixture of oil and water or ozonated water, and/or dissipating the ozone in said oil;

wherein said water or ozonated water is supplied to an amount of about 3 to about 8% by volume of the volume of the oil.

2. A method according to claim 1, wherein steps (a) to (d) form a pretreatment step, and wherein the pretreatment step is followed by a further ozonation process.

3. A method according to claim 1, further comprising:
(e) separating said oil from said water subsequent to step (d).

4. A method according to claim 1, wherein said water or ozonated water is supplied in an amount of 5% by volume of the volume of the oil.

5. A method according to claim 1, wherein said oil is provided in a vessel, the vessel having a top and a bottom, wherein in step (b) the water is introduced into said oil by using water and ozone, and wherein the ozone is introduced from the bottom of the vessel.

6. A method according to claim 5, wherein said ozone is introduced to a concentration of about 4000 to about 30000 ppm.

7. A method according to claim 5, wherein said ozone is introduced to a concentration of about 7000 ppm.

8. A method according to claim 1, wherein said mixing and/or agitating and/or dissipating is done by a screw-type propeller with sawtooth-edged blades.

9. A method according to claim 8, wherein said propeller rotates at about 300 rpm.

10. A method according to claim 1, wherein steps (a)–(d) take about 20 to about 30 minutes.

11. A method according to claim 3, further comprising subjecting the oil separated from said water to (f) an ozonation process.

12. A method according to claim 11, wherein said step (f) is carried out at a temperature of about 40° C. to 80° C.

13. A method according to claim 11, wherein said ozone is introduced to a concentration of about 4000 to about 30000 ppm.

14. A method according to claim 11, wherein said oil is contained in a vessel, the vessel having a top and a bottom, and wherein said ozone is introduced from the bottom of said vessel.

15. A method according to claim 13, wherein said ozonation process is continued for about 50 to 90 minutes.

16. A method according to claim 11, further including adding activated kaolin to said separated oil for adsorbing the impurities prior to step (f).

17. A method according to claim 16, wherein the amount of activated kaolin is about 5% by volume to about 8% by volume of said oil.

18. A method according to claim 16, wherein the kaolin is removed from the oil prior to step (f).

19. A fuel oil obtained by a method comprising:
a) heating a volume of virgin plant oil and/or waste vegetable oil to a temperature of 40 to 80° C.;
b) introducing at least one of (i) ozone, (ii) ozonated water, and (iii) water into said oil;
c) mixing the product of step (b); and
d) agitating the mixture of oil and water or ozonated water, and/or dissipating the ozone in said oil;
wherein said water or ozonated water is supplied to an amount of about 3 to about 8% by volume of the volume of the oil.

20. A fuel oil according to claim 19, further comprising:
(e) separating said oil from said water, and
(f) subjecting the oil obtained from step (e) to an ozonation process.

21. A fuel according to claim 20, wherein said fuel oil is diesel oil.

22. A method according to claim 1, wherein said agitation step is performed with a propeller agitator including sawtooth-edged blades.

23. A method according to claim 22, wherein said propeller agitator is attached to an agitation shaft below a conventional impeller.

24. A method according to claim 22, wherein said method is at least partially carried out in a second processing tank including at least one of an agitation propeller, an ozone gas spin distributor device, an activated charcoal tube, a heater and an intake valve.

* * * * *